United States Patent Office 3,216,945
Patented Nov. 9, 1965

3,216,945
PAINT REMOVER FOR NON-FERROUS METAL PARTS
Abraham Mankowich, Bel Air, Md., assignor to the United States of America as represented by the Secretary of the Army
No Drawing. Filed Aug. 7, 1962, Ser. No. 215,465
4 Claims. (Cl. 252—111)
(Granted under Title 35, U.S. Code (1952), sec. 266)

The invention described herein may be manufactured and used by or for the Government for governmental purposes without the payment to me of any royalty thereon.

This invention deals with compositions of matter for use as alkaline soak strippers of paint from metal surfaces and particularly from non-ferrous surfaces. It deals more particularly with alkaline soak paint strippers comprising specific alkaline salt detergents and a soap of a fatty acid combined with specific glycols or triols or mixtures thereof into single phase, organic-alkaline systems. Preferably, the compositions also contain specific hydroxyalkyl amines. The alkaline salt detergents are inorganic salts or mixtures thereof which when dissolved in the single phase systems referred to herein produce a pH not exceeding 12.2 and contain anionic groups that act as corrosion inhibitors for the non-ferrous basis metals. Because of their increased stripping power, the aforementioned compositions are especially suitable for the removal of paint from missile component parts. The stripping efficiency of the compositions of the present invention is 50% to 75% greater than conventional alkaline paint removers which are used on non-ferrous metals.

Single phase, organic-alkaline paint strippers have been reported heretofore (U.S. Patent 2,479,628). The co-solvents of such paint strippers, the monobutyl ethers of mono- or polyethylene glycol, have been found ineffective in producing stable one phase systems.

The object of the present invention is, therefore, the development of compositions of matter for use as alkaline soak paint strippers of the single phase, organic-alkaline system type suitable for use with non-ferrous metal surfaces. It is obvious that the chief organic ingredients of the composition must be high boiling, high flash point, water soluble liquids possessing powerful co-solvent characteristics.

I have discovered that the above-mentioned objective can be attained by combining a mixture of alkaline salt detergents with laurate soap and an organic solvent, one from a group of specific glycols and triols. The free hydroxyl groups of glycols and triols impart co-solvent properties to these materials, with clear, stable single phase systems resulting. The latter systems are capable of being utilized as soak-type paint strippers at elevated temperatures. They possess improved paint stripping power because of the combined action of the alkaline salt with the laurate soap and the film softening and penetrating characteristics of the glycols and triols. The effectiveness of the paint stripping action may be enhanced by addition of specific hydroxyalkylamines to the single phase organic-alkaline system. Examples of the glycols and triols refered to are propylene glycol, dipropylene glycol, hexylene glycol, ethylene glycol, triethylene glycol, thiodiethylene glycol, 1,5-pentanediol, and 1,2,6-hexanetriol. Examples of the hydroxylalkylamines referred to are diethanolamine and triethanolamine.

As examples of compositions illustrating this invention, the following are given.

*Example I*

| Component: | Percent by weight |
|---|---|
| Sodium metasilicate pentahydrate | 17.3 |
| Trisodium phosphate dodecahydrate | 23.6 |
| Sodium biphosphate monohydrate | 5.9 |
| Lauric acid | 2.2 |
| Sodium hydroxide | 0.3 |
| Hexylene glycol | 50.7 |

This composition is used in water solution at a concentration of 18 weight percent (on a weight-to-volume basis) at a boil.

*Example II*

| Component: | Percent by weight |
|---|---|
| Sodium metasilicate pentahydrate | 14.5 |
| Trisodium phosphate dodecahydrate | 19.7 |
| Sodium biphosphate monohydrate | 4.9 |
| Lauric acid | 1.8 |
| Sodium hydroxide | 0.2 |
| Diethanolamine | 8.1 |
| 1,2,6-hexanetriol | 50.8 |

This composition is used in water solution at a concentration of 22 weight percent (on a weight-to-volume basis) at a boil.

*Example III*

| Component: | Percent by weight |
|---|---|
| Sodium metasilicate pentahydrate | 20.1 |
| Trisodium phosphate dodecahydrate | 27.3 |
| Sodium biphosphate monohydrate | 6.8 |
| Lauric acid | 2.5 |
| Sodium hydroxide | 0.3 |
| Hexylene glycol | 43.0 |

This composition is used as in Example I.

*Example IV*

| Component: | Percent by weight |
|---|---|
| Sodium metasilicate pentahydrate | 15.4 |
| Trisodium phosphate dodecahydrate | 21.1 |
| Sodium biphosphate monohydrate | 5.3 |
| Lauric acid | 2.0 |
| Sodium hydroxide | 0.2 |
| Hexylene glycol | 56.0 |

This composition is used as in Example I.

*Example V*

| Component: | Percent by weight |
|---|---|
| Sodium metasilicate pentahydrate | 16.7 |
| Trisodium phosphate dodecahydrate | 22.9 |
| Sodium biphosphate monohydrate | 5.7 |
| Lauric acid | 2.1 |
| Sodium hydroxide | 0.3 |
| Diethanolamine | 9.3 |
| 1,2,6-hexanetriol | 43.0 |

This composition is used as in Example II.

*Example VI*

| Component: | Percent by weight |
|---|---|
| Sodium metasilicate pentahydrate | 12.9 |
| Trisodium phosphate dodecahydrate | 17.6 |
| Sodium biphosphate monohydrate | 4.4 |
| Lauric acid | 1.7 |
| Sodium hydroxide | 0.2 |
| Diethanolamine | 7.2 |
| 1,2,6-hexanetriol | 56.0 |

This composition is used as in Example II.
The lauric acid used in the above examples forms the sodium soap in situ on solution of the ingredients in water. It will be evident to those skilled in the art that this invention is not limited to the details of the foregoing illustrative examples, and that changes can be made in the types and amounts of alkaline salts, soaps, glycols and triols.

For optimum paint removability, the concentration of water solutions, weight to volume, should be as given in Examples I thru VI. This concentration may be varied from 17–25 weight percent, based on the total volume of solution used. The glycol or triol content of the water free composition may be varied from 43 to 56 percent by weight, and the hydroxyalkylamine content may be varied from zero to 10 percent by weight. Sodium hydroxide may be varied from 0.2 to 0.3 percent by weight and lauric acid may be varied from 1.7 to 2.5 percent by weight. Sodium metasilicate pentahydrate, trisodium phosphate dodecahydrate, and sodium biphosphate monohydrate may be varied in the range of from 13 to 20 percent by weight, from 18 to 27 percent by weight, and from 4 to 7 percent by weight, respectively.

I claim:

1. A paint stripping concentrate having the following composition by weight:

| | Percent |
|---|---|
| (a) Sodium metasilicate pentahydrate | 13–20 |
| (b) Trisodium phosphate dodecahydrate | 18–27 |
| (c) Sodium biphosphate monohydrate | 4–7 |
| (d) Lauric acid | 1.7–2.5 |
| (e) Sodium hydroxide | 0.2–0.3 |
| (f) Diethanolamine | Up to 10 |
| (g) 1,2,6-hexanetriol | 43–56 |

2. A paint stripping concentrate consisting essentially of the following composition by weight: from about 13 to 20 percent sodium metasilicate pentahydrate, from about 18 to 27 percent trisodium phosphate dodecahydrate, from about 4 to 7 percent sodium biphosphate monohydrate, from about 1.7 to 2.5 percent lauric acid, from about 0.2 to 0.3 percent sodium hydroxide, and of from 43 to 56 percent of a polyhydric alcohol selected from the group consisting of ethylene glycol, propylene glycol, dipropylene glycol, hexylene glycol, 1,2,6-hexanetriol, triethylene glycol and 1,5-pentanediol.

3. A paint stripping composition in accordance with claim 2 which includes a hydroxyalkylamine selected from the group consisting of diethanolamine and triethanolamine, said hydroxyalkylamine being present therein in an amount not exceeding 10 percent by weight.

4. An aqueous solution having a pH of not more than 12.2 comprising from about 17 to 25 percent by weight of the composition of claim 2, said percentage by weight being based on the total volume of said solution.

References Cited by the Examiner
UNITED STATES PATENTS

| | | | |
|---|---|---|---|
| 1,829,583 | 10/31 | Davidson et al. | 252—89 |
| 2,093,824 | 9/37 | Noronoff | 252—139 XR |
| 2,443,173 | 6/48 | Baum et al. | 252—127 |
| 2,614,992 | 10/52 | Mankowich | 252—137 |
| 2,768,213 | 10/56 | Whetstone et al. | 260—635 |
| 2,898,246 | 8/59 | Hannah | 134—38 |
| 2,929,789 | 3/60 | Pickett et al. | 252—111 XR |

OTHER REFERENCES

Bennett: "Chemical and Technical Dictionary" (1962) Chem. Publ. Co., page 852.

Bennett: The Chemical Formulary, vol. 6 Chemical Publ. Co. (1943), page 484.

JULIUS GREENWALD, *Primary Examiner.*